United States Patent [19]

Wengeler

[11] Patent Number: 4,886,144
[45] Date of Patent: Dec. 12, 1989

[54] LUBRICATING APPARATUS FOR BEARINGS

[75] Inventor: Ulf Wengeler, Halmstad, Sweden

[73] Assignee: SKF Mekanprodukter AB, Katrineholm, Sweden

[21] Appl. No.: 208,688

[22] Filed: Jun. 20, 1988

[30] Foreign Application Priority Data

Jun. 23, 1987 [SE] Sweden .................................. 8702597

[51] Int. Cl.$^4$ ...................... F01M 1/18; F16N 11/04; F16N 29/00
[52] U.S. Cl. .................................... 184/45.1; 184/68; 184/6.4; 184/108
[58] Field of Search ....................... 184/45.1, 6.4, 108, 184/68; 417/292

[56] References Cited

U.S. PATENT DOCUMENTS

| | | | |
|---|---|---|---|
| 913,553 | 2/1909 | Parr | 184/68 |
| 1,595,959 | 8/1926 | Barrows | 184/68 |
| 1,737,838 | 12/1929 | Fuller | 184/45.1 |
| 1,779,351 | 10/1930 | Armstrong | 184/45.1 |
| 1,813,122 | 7/1931 | Moore | 184/68 |
| 1,891,544 | 12/1932 | Kerns | 184/45.1 |
| 4,125,176 | 11/1978 | Thrasher | 184/108 |

Primary Examiner—Henry A. Bennet
Assistant Examiner—Denise L. Ferensic
Attorney, Agent, or Firm—Eugene E. Renz, Jr.

[57] ABSTRACT

An apparatus for automatic lubrication of bearings which apparatus incorporates a feeding device (2, 3) for grease and a valve member (7) intended to be connected to a bearing housing. In the valve member (4) is provided at a heat activated member (5) for sensing the bearing housing temperature and which, when a predetermined activation temperature is exceeded, is arranged to expand and to cause a restriction of the lubricant feed.

5 Claims, 1 Drawing Sheet

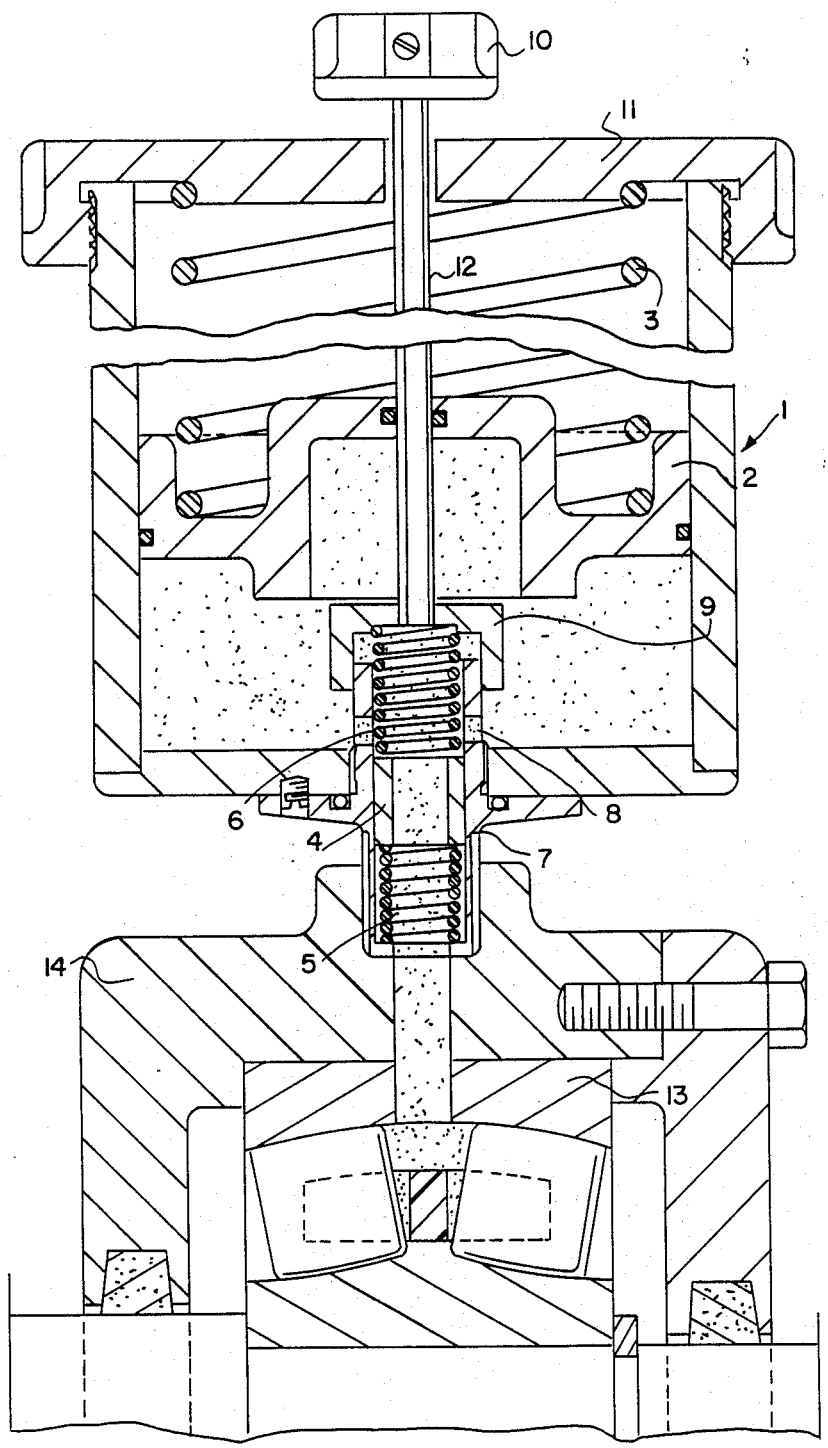

LUBRICATING APPARATUS FOR BEARINGS

FIELD OF THE INVENTION

The present invention relates to an apparatus for automatic lubrication of bearings in which a valve member is connected to a bearing housing. The valve member includes a feeding device to transfer grease to the bearing.

BACKGROUND OF THE INVENTION

It has long been known that rolling bearings must be lubricated to avoid direct metal to metal contact between rolling bodies, bearing rings, and retainers and the like. The function of the lubricant is not only to prevent wear and avoid metallic contact, but also to prevent corrosion.

It is most advantageous to use a relatively small quantity of lubricant, in which the most advantageous operating temperature for that bearing is achieved. This is accomplished by using precisely the minimum amount of lubricant necessary for reliable lubrication. On those occasions when the lubricant is to provide other functions as well, such as sealing or cooling, the amount of lubricant may be greater.

It is also well known that a lubricant loses its effectiveness over time, due to mechanical work on the lubricant as well as due to aging of the materials from which it is made. A used and polluted lubricant must be replaced and renewed at regular time intervals in order to provide a uniform and effective lubrication of the bearing or other mechanical device. In many instances, rolling bearings are lubricated with grease during the normal service operation of the machine. Grease has a particular advantage, when compared to oil, for example, in that it much more readily stays in the bearing location, particularly in mechanisms including a shaft where the shaft is inclined or is vertical. Grease also provides certain corrosion inhibiting properties which are of value. The choice of the particular grease formulation depends upon the service conditions, which are themselves governed primarily by the temperature range, the speed of operation, and the environment in which the bearing is operating.

In some circumstances, the service conditions require frequent follow on lubrication of the device. Thus bearing housing may, be provided with a particular device such as a bore and nipple to allow grease lubrication. When the bearing is under a heavy load, it can be connected to an automatic lubrication apparatus which continuously provides lubrication to the bearing without the need of supervised or manual work.

These are many automatic lubricating devices on the market today, operating under various different principles. These lubricating devices have serious functional deficiencies which prevents them from providing the intended lubricating effect. Many times, the prior automatic lubricating devices are inferior as an alternative to manual lubrication. Deficiencies occur quite frequently when excessive grease is fed into the bearing, causing a serious increase in bearing temperature, along with the resultant extra wear and other difficulties. Bearing life is reduced at these higher temperatures.

Some automatic lubricating apparatus will fail to lubricate or provide lubrication on an irregular basis. In this circumstance, the devices fail to provide a regular and continuous lubrication which is of extreme importance in demanding applications, such as bearings operating at high speeds and loads. Under these circumstances, rapid changes in operating conditions are magnified and the bearing life is again substantially reduced.

Automatic lubricating devices function basically by feeding the grease to the bearing in a variety of ways. Most common are those which utilize spring biased pistons and those having an electrolytically general driving gas, which acts upon a diaphram connected to a piston.

One method for controlling the amount of oil lubrication to a lubricating device is to adjust the oil supply continuously using heat activatable elements. As an example of such a device, French Patent No. FR-A-877500 shows an oil supply that is normally controlled in such a manner that the oil quantity supplied increases at increasing temperature in the device being lubricated. This is not an adequate solution for a grease lubrication design, however, since an increase in temperature causing an increase of grease lubrication to the bearing would result in an increased temperature of the bearing housing.

Accordingly, it is an object of the present invention to provide a new type of lubricating apparatus for automatic and controlled supply of a lubricating grease to rolling bearings which are mounted in bearing housings.

SUMMARY OF THE INVENTION

It has now been discovered that the above and other objects of the present invention can be accomplished in the following manner. Specifically, a device has been discovered in which a continuous lubrication of a rolling bearing takes place when the bearing is within an operation temperature interval or range. When the bearing housing temperature increases due to excessive lubrication, the lubricating grease supply is automatically interrupted.

Specifically, an apparatus has been discovered for automatically lubricating a bearing. A feeding device is provided for grease and a valve member is connected to a bearing housing. The valve member includes a generally tubular valve body and a heat activatable member comprising a member metal spring which engages one end of the body. The spring senses the temperature of the bearing housing and expands when a certain predetermined activation temperature is exceeded. At this point, the supply of grease is interrupted, so that the bearing returns to its normal operating range.

BRIEF DESCRIPTION OF THE DRAWINGS

These and other objects of the present invention and the various features and details of the operation and construction thereof are hereinafter more fully set forth with reference to the accompanying drawings, wherein:

The FIGURE is a side elevational view taken in section of the preferred embodiment of the lubricating apparatus of the present invention.

DETAILED DESCRIPTION OF THE PREFERRED EMBODIMENT

As shown in the drawing, there is a grease injector which employs a cylinder 1 having a movable piston 2 contained inside. Grease is contained as shown in the cylinder 1 under pressure from the piston 2 and is moved to lubricate the bearing, by force from spring 3 acting on piston 2. Grease is transferred from the cylinder and piston arrangement, 1, 2, to the bearing 13 housing 14. The transfer is accomplished using a tubular valve body 4 which is clamped between two springs 5 and 6. The valve body 4 is movable in a vertical direction in housing 7 in a manner such that the upper portion of valve body 4 covers outlet openings 8 in the valve housing 7 when the body 4 is raised. Outlet openings 8 communicate with the interior of the cylinder 1 and piston 2 which contains the grease to be supplied to the bearing.

The lower spring 5 is known as a memory metal spring. That is, spring 5 is a coil spring made from a memory metal, comprised of metal alloys which are activated at a certain temperature. When an activating temperature is reached, the spring, when shaped as a coil spring as shown in the FIGURE, may double in its length. The spring is reversible, so that it will resume its initial length when the temperature is lowered below that activation temperature. Memory metal coil springs are available commercially and are normally manufactured from metal alloys such as titanium nickel and copper zinc aluminum alloys.

To balance the memory metal spring 5, an upper spring 6 provides a counter force. In this manner, a very narrow temperature interval for the activating temperature is provided. The upper spring 6 is clamped between the valve body such that a nut 9 is threaded upon the valve housing 7. This nut may be adjusted by means of a grip 10 which extends out through the cover 11 of the cylinder 1. Use of adjustment bar 12 allows the nut 9 to be adjusted to provide precisely that amount of counterforce against which the memory metal spring 5 is acting.

The lower part of the valve housing 7, which surrounds the memory metal spring 5, extends into the bearing housing 14 and is secured thereto by conventional means, which are not shown herein. The spring 5 is balanced against the spring 6 so that the memory metal spring 5 is in its compressed position during normal operating conditions in the bearing housing 14. This is the condition shown in the FIGURE, wherein the valve is opened and grease flows through the opening 8 into the bearing 13. The bearing 13 operates at a conventional temperature and the valve is opened, feeding grease continuously into the bearing housing 14.

If an excessive amount of lubricant is introduced into the bearing housing 14 the bearing housing 14 temperature will increase. When a predetermined activation temperature is exceeded, such as by way of example 60° C., the memory metal spring 5 will expand, pushing the tubular valve body 4 against counterbiasing spring 6. When this happens, the valve body 4 is lifted into the valve housing 7 in the direction away from the bearing 13 itself. The valve body 4 covers the openings 8, thereby cutting off the flow of grease into the bearing housing 14. When the temperature drops below the activation temperature, the spring 5 will resume its initial compressed position. The counterbalancing force of spring 6 will assist the return of spring 5 to its compressed position. When this happens, of course, the valve body 4 no longer covers openings 8 and the valve is once again opened.

In a number of experiments, tests have shown that a lubricating apparatus of the type described above can be provided where the apparatus has an on-off function with respect to the supply of grease. In this manner, it is possible to limit the bearing housing temperature to a predetermined temperature of say, for example, 60° C., for up to about ninety (90%) percent of the time the bearing is in operation. It is only during the comparatively short period of time when the flow of grease to the bearing causes the temperature to peak that the temperature exceeds this predetermined temperature. In comparison, the conventional automatic lubricating devices which are currently available allow the bearing housing temperature to reach the higher temperatures and remain there for much longer periods of time. In that circumstance, additional wear of the parts is experienced. More important, at the higher operating temperatures, the effectiveness and life of the grease decreases rapidly and the aging process is accelerated.

While particular embodiments of the present invention have been illustrated and described herein, it is not intended to limit the invention and changes and modifications may be made therein within the scope of the following claims.

What is claimed is:

1. An apparatus for automatic lubrication of bearings mounted to sense bearing housing temperature, comprising a housing (1) defining a reservoir for lubricant, a spring actuated piston (2) for discharging lubricant at a discharge end of said housing, a valve assembly (7) at said discharge end having an elongated hollow housing with discharge openings (8) communicating with said lubricant reservoir, a substantially tubular valve body (4) slidably mounted for axial movement in said valve housing, spring biasing means (5, 6) acting on opposing ends of said valve body (4), at least one of said springs (5) being in the form of a memory metal spring (5) positioned to sense the temperature of the bearing housing and to expand when a predetermined activation temperature is exceeded to thereby cause the memory metal spring (5) to move the valve body (4) in the valve member housing (7) to a position closing said openings to interrupt the supply of lubricant to the bearing housing said biasing means normally positioning said valve (4) in an open position permitting flow of lubricant.

2. An apparatus as claimed in claim 1, wherein the memory metal spring (5) at least partly is received in a portion of the valve member (7) projecting from the main part (1) of the lubrication apparatus, whereby said portion is designed thus that is mounting in the bearing housing is made possible.

3. An apparatus as claimed in claim 2, wherein the memory metal spring (5) is clamped between the valve body (4) and a portion projecting radially inwards at the outer end of the valve member (7).

4. An apparatus as claimed in claim 1, wherein the lubricant is arranged to be fed out axially through the memory metal spring (5).

5. An apparatus as claimed in claim 1, wherein the valve body (4) is clamped between the memory metal spring (5) and spring (6) located between the valve body (4) and the inner end of the valve member (7).

* * * * *